United States Patent
Nishimura et al.

[11] Patent Number: 6,160,577
[45] Date of Patent: *Dec. 12, 2000

[54] METHOD FOR EXPANDING MEMORY CAPACITY FOR PHOTO FILM AND A FILM PLAYER

[75] Inventors: Toru Nishimura; Atsushi Itoh, both of Asaka, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/852,960

[22] Filed: May 8, 1997

Related U.S. Application Data

[63] Continuation of application No. 08/358,595, Dec. 14, 1994, abandoned.

[30] Foreign Application Priority Data

Dec. 14, 1993 [JP] Japan ................................. 5-313257

[51] Int. Cl.⁷ ..................................................... H04N 7/14
[52] U.S. Cl. ................................................ 348/96; 348/97
[58] Field of Search .............................. 386/46, 107, 117, 386/52; 348/96, 97; 355/40; 358/906; 396/211, 315

[56] References Cited

U.S. PATENT DOCUMENTS

| | | | |
|---|---|---|---|
| 4,728,978 | 3/1988 | Inoue et al. | 396/211 |
| 4,888,648 | 12/1989 | Takeuchi et al. | 358/335 |
| 4,974,096 | 11/1990 | Wash | 358/906 |
| 5,036,344 | 7/1991 | Inoue et al. | 396/211 |
| 5,142,310 | 8/1992 | Taniguchi et al. | 348/96 |
| 5,237,156 | 8/1993 | Konishi et al. | 355/40 |
| 5,255,031 | 10/1993 | Ikenoue | 396/315 |
| 5,258,859 | 11/1993 | Wada et al. | 359/909.1 |
| 5,309,242 | 5/1994 | Asami et al. | 348/97 |
| 5,418,926 | 5/1995 | Hori et al. | 358/909.1 |
| 5,633,977 | 5/1997 | Inoue et al. | 386/46 |

FOREIGN PATENT DOCUMENTS

| | | |
|---|---|---|
| 5-56345 | 3/1993 | Japan . |
| WO9004301 | 4/1990 | WIPO . |

*Primary Examiner*—Huy Nguyen

[57] ABSTRACT

The memory capacity for photo film can be expanded with an external memory medium. In addition, lab service can be changed and/or added. A memory card 120 is arranged in the film player, and a small amount of information indicating the memory area of the memory card 120 which corresponds to each frame is recorded magnetically in a record track which corresponds to each frame of the photo film. A large amount of information related to each frame is recorded in the memory card 120. With this arrangement, the memory capacity for the photo film can be expanded. In addition, the memory card 120, in which the lab service program is recorded, can be used, and the lab service program can be loaded from the memory card 120 to the EEPROM 123 through the interface 124 by the film player. Therefore, although the service to the lab may be changed and/or added, a new lab service program can be entered and can give the order application to the lab with the new lab service.

9 Claims, 5 Drawing Sheets

METHOD FOR EXPANDING MEMORY CAPACITY FOR PHOTO FILM AND A FILM PLAYER

This application is a continuation, of application Ser. No. 08/358,595 filed on Dec. 14, 1994, now abandoned.

BACKGROUND OF THE INVENTION

1. Field of the Invention

The present invention relates to a method for expanding memory capacity for a photo film and to a film player. More particularly, it relates to a method for expanding memory capacity for a photographic film and to a film player wherein the memory capacity for the photo film is expanded with an external memory medium such as an IC memory card or a service at a lab (processing laboratory), which can be changed and added with the external memory medium.

2. Description of the Related Art

Conventionally, in a film player wherein a developed film for a still camera is focused by an image sensor such as a CCD, and wherein an image of the film is transferred into image signals, the image signals are output to the TV monitor and the image of the film as displayed, is disclosed in WO90/04301, Japan Patent Application Laid-Open No.5-56345 and the like. WO90/04301 discloses a camera and film player which use a photo film provided with a magnetic recording track.

Now, as shown in FIG. 6, though the camera and film player which can store magnetic information in the magnetic track of the film have a lot of information to be stored for every frame, the length of the record track 10 for every frame is limited. Therefore, there is a problem in that the record track 10 can store only a little information related to a frame. Further, WO90/04301 shows that many record tracks are provided on the film overall. However, in this case, there is another problem that the magnetic head damages the emulsion surface in which the film image is taken.

Additionally, there is no film player with an order function to a lab. If the order function to the lab is employed in the film player, and further when the services are changed and/or added at the lab, it becomes a further problem that no service is given to users of former film players. Further, when the services are changed and/or added, it becomes necessary for makers and dealers to revise devices.

SUMMARY OF THE INVENTION

The present invention has been developed to eliminate the above-described and other problems and provides a method of expanding memory capacity for a photo film and a film player, wherein the memory capacity for the photo film can be expanded with an external memory medium and services can be changed and/or added at a lab.

To achieve the above-described and other objects, the method of expansion of memory capacity for a photo film comprises the steps of: employing in a still camera, a magnetic record layer in which magnetic information can be recorded; recording information related to each frame of said photo film during recording of each frame, in a record area corresponding to each frame in an external memory medium, and recording information indicating the record area recorded in the magnetic record layer; and, reading the information indicating the record area of said external memory medium from the magnetic record layer corresponding to each frame of said photo film, during reproduction of each frame, and reading out information related to the frame from said external memory medium based on the information which is read.

Further, to achieve the above-described object, a film player in which an image of a developed still photo film is focused on an image sensor through a taking lens and image signals which are converted photo-electrically by said image sensor are output to a TV monitor, whereby a film image is reproduced on the TV monitor, said film player comprising: an interface part for inputting a lab (processing laboratory) service program from an external memory medium; memory means for keeping memory contents which can be written and eliminated without backing up; means for loading the lab service program from said external memory medium to said memory means through said interface part; an operation part for an order application to a lab; and, process means for performing said lab service program recorded in said memory means based on an operation by said operation part and for processing said order application to said lab.

According to this invention, information (such as a record address) indicating which record area corresponds to each frame of the external memory medium such as a IC card, is recorded in the magnetic record layer which corresponds to each frame of the still photo film, and various other information including an environment condition, a film number, a print format, a photographing date/time and an order application information to a lab is also recorded. When reproducing, the information indicating the record area of the external memory memory medium is read from the magnetic record layer corresponding to each frame of the film, and information related to the frame is read from the external memory medium based on the information which is read. With this arrangement, only a little information showing the record area corresponding to each frame of the external memory medium needs to be recorded in the record track corresponding to each frame of the photo film, and a lot of information related to each frame can be stored in the external memory medium.

Further, in the film player in which an image of a developed still photo film is focused on an image sensor through a taking lens and image signals which are converted photo-electrically by said image sensor are output to a TV monitor, whereby a film image is reproduced on the TV monitor, a memory (such as an EEPROM) is included for keeping the memory contents which can be written and eliminated without backing up, and the lab service program is loaded from the external memory medium to said memory through the interface part. Further, the lab service program recorded in said memory is performed, whereby the order application to the lab is processed. Therefore, although the service for the lab may be changed or added, there is no need to change the hardware of the film player.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The exact nature of this invention, as well as other aims and advantages thereof, will be readily apparent from consideration of the following specification relating to the accompanied drawings, in which like reference characters designate the same or similar parts throughout the figures thereof and wherein.

DESCRIPTION OF THE PREFERRED EMBODIMENT

A detailed description will hereafter be given of the preferred embodiment of a method of expanding memory capacity for a photo film and a film player according to the present invention with reference to the accompanying drawings.

Figure 1:
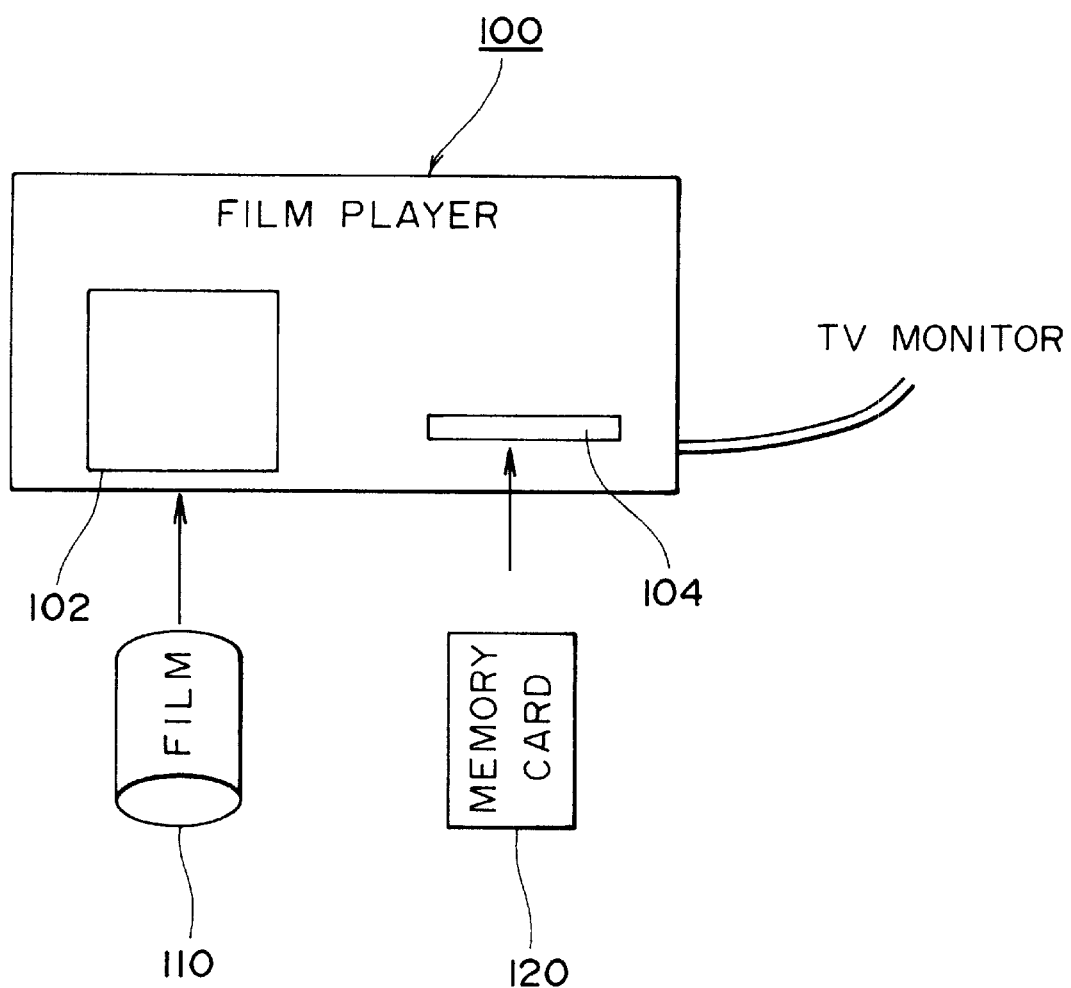
FIG. 1 is a schematic structural view showing one embodiment of a film player according to the present invention.

FIG. 1 is a schematic structural view showing one embodiment of a film player according to this invention. As shown in FIG. 1, a film player 100 is shaped in a rectangular parallelepiped, and a film cartridge storing part 102 and a memory card storing part 104 are provided at the front thereof. In the film cartridge storing part 102, the film cartridge 110 is taken in and out, and in the memory card storing part 104, the memory card 120 is taken in and out at the same time of the film cartridge 110.

The film player 100 is connected with an operation part 125 (see FIG. 2) and a TV monitor, and various operation signals are output from the operation part 125 to the film player 100 to control the film player 100. Further, image signals are output from the film player 100 to the TV monitor.

Figure 2:
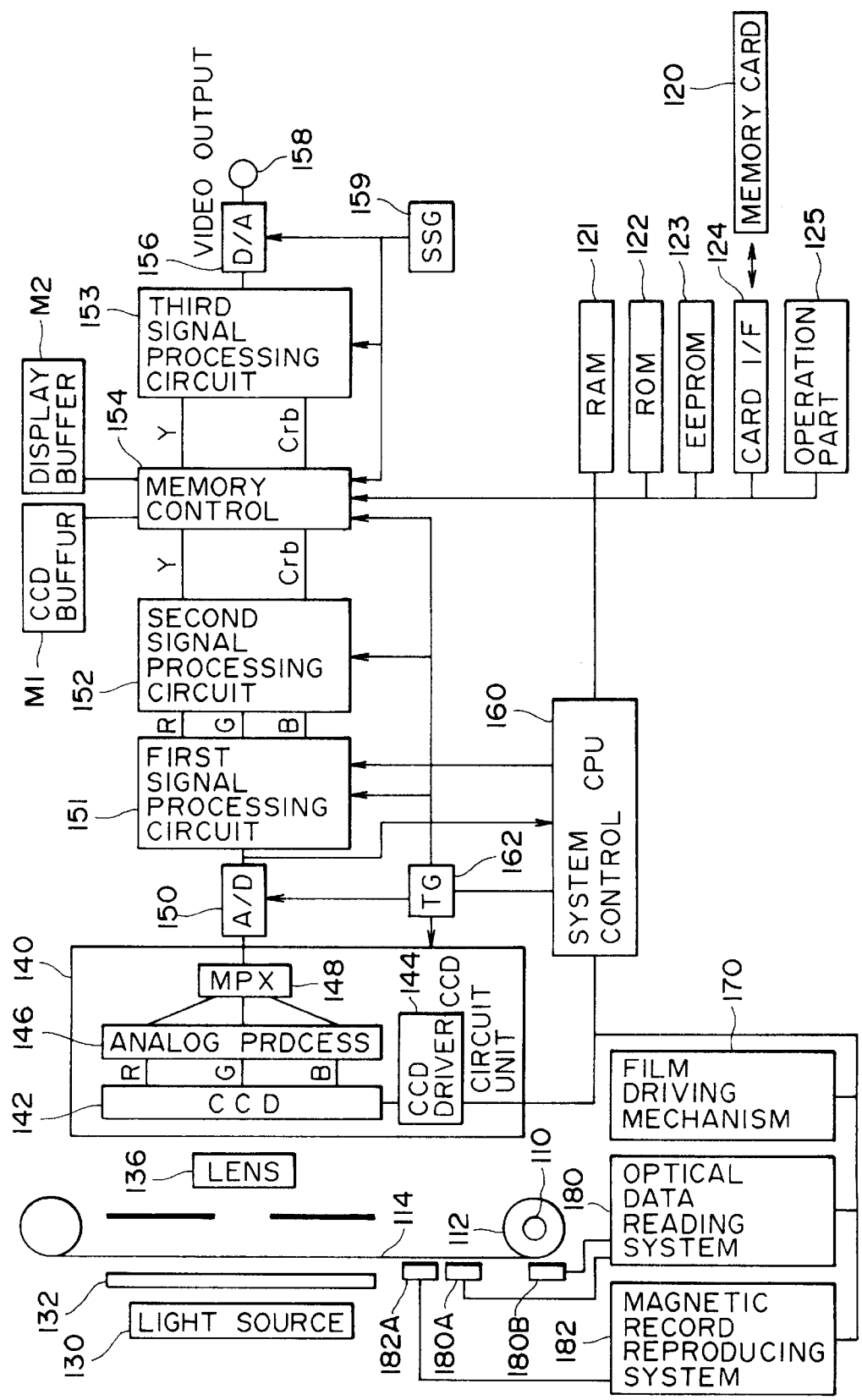
FIG. 2 is a block diagram showing one embodiment of the internal structure of the film player shown in FIG. 1.

FIG. 2 is a block diagram showing an embodiment of the internal structure of the film image input system 100.

Figure 3:
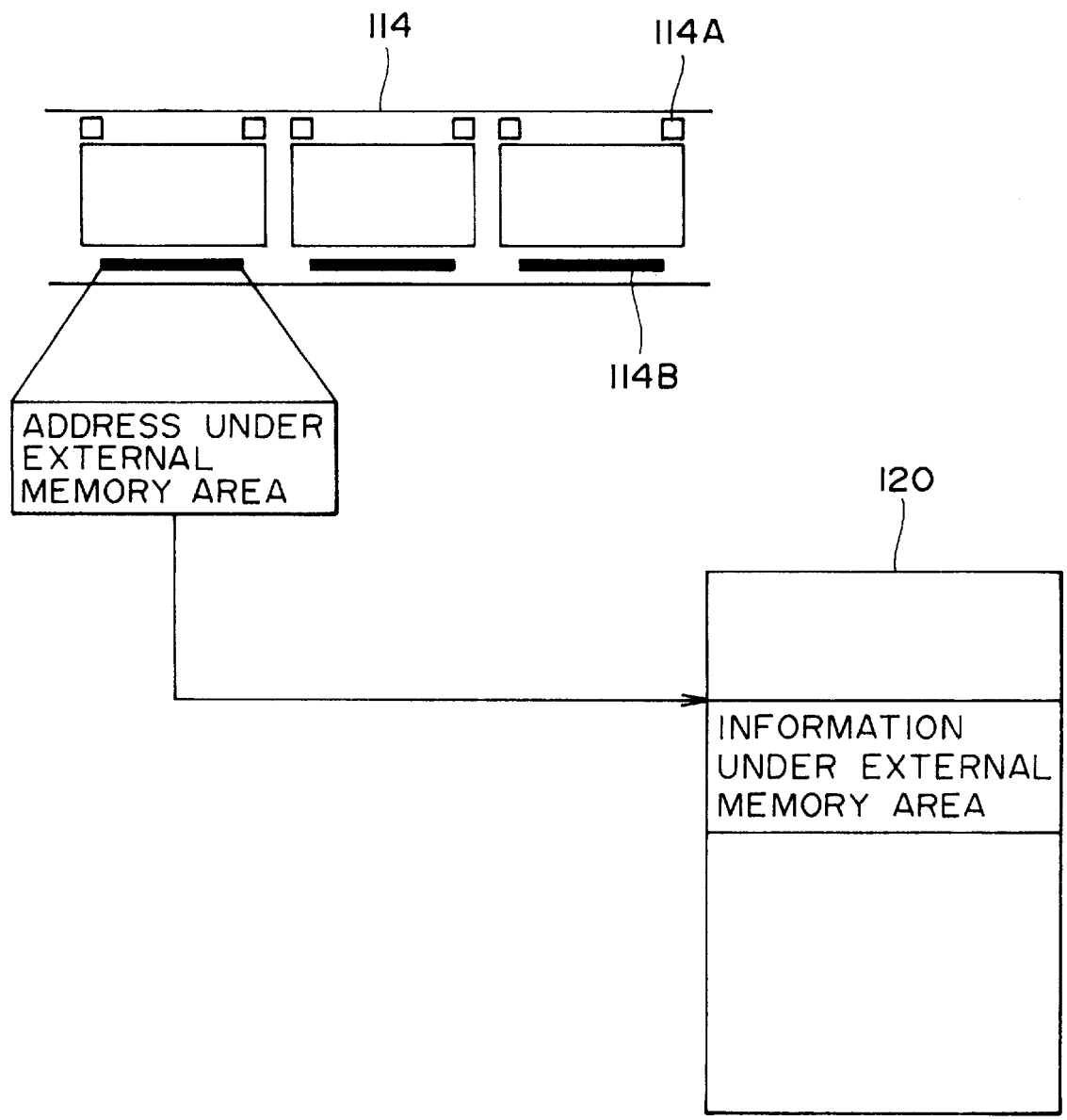
FIG. 3 is a view explaining an method of expanding memory capacity for a photo film according to the present invention.

The film image input system 100 comprises a light source 130 for lighting, a taking lens 136, a CCD circuit unit 140 including a CCD line sensor 140, a first signal processing circuit 151, a second signal processing circuit 152, a third signal processing circuit 153, a memory control circuit 154, a CCD buffer M1, a display buffer M2, a central processing unit (CPU) 160, a film driving mechanism 170, an optical data reading system 180, a magnetic record reproducing system 182 and the like. Further, the film cartridge 110 applied to the film player 100 includes a single spool 112, and a photo film 114 is wound around the spool 112. As shown in FIG. 3, perforation 114A indicating a position of each frame is opened, and a magnetic record layer 114B is formed overall the film or at the edge portion of the film. Information related to each frame can be stored in the respective magnetic record layer 114B. And, the developed film 114 is wound with the film cartridge 110 to thereby be stored.

The light source 130 consists of, for example, a fluorescent light in a longitudinal direction perpendicular to the feeding direction of the film 114, and illuminates the film 114 through an infrared light cutting filter 132. The image light which permeates through the film 114 is focused on the light receiving surface of the CCD line sensor 142 through the taking lens with a focal point.

The CCD line sensor 142 is placed in the direction perpendicular to the film feeding direction. The image light focused on the light receiving surface of the CCD line sensor 142 is charged and stored at each sensor which has an R, G or B filter for a predetermined time, and converted to a signal charges of R, G or B in accordance with the intensity of the light. The stored signal charges are read to a sift resistor with a lead gate pulse having a predetermined cycle from the CCD driving circuit 144, and is read by the resistor transmitting pulse, sequentially.

With this arrangement, the signal charges which are read from the CCD line sensor 142 are clamped with a CCD clamp, and input to an analog processing circuit 146 as the R, G, B signals and the gain and the like of the R, G, B signals are controlled. The R, G, B signals output from the analog processing circuit 146 are point-sequenced by a multiplexer 148 and converted to digital signals by an A/D converter 150, thereafter, output to the first signal processing circuit 151 and the CPU 160.

The first processing circuit 151 includes a white balance adjustment circuit, a negative-positive changing circuit, a γ-correcting circuit, an RGB synchronizing circuit and the like, and processes the point sequenced R, G, B signals, which are input sequentially, in the respective circuits, and then outputs the synchronized R, G, B signals to the second signal processing circuit 152. The second signal processing circuit 152 has a matrix circuit, and produces a luminance signal Y and a chromatic signal Cr/b and outputs them to a memory control circuit 154.

The memory control circuit 154 controls the luminance signal Y and the chromatic signal Cr/b which are written/read to the CCD buffer M1 and the luminance signal Y and the chromatic signal Cr/b, which are memorized in the buffer M1, are written/read to the display buffer M2. The luminance signal Y and the chromatic signal Cr/b, which are read from the display buffer by the memory control circuit 151, are output to the third signal processing circuit 153. In the third signal processing circuit, color combined image signals of a mode such as NTSC mode are produced based on the luminance signal Y and the chromatic signal Cr/b, and then are output to a video output terminal 158 through the D/A converter 156.

Moreover, synchronized signals having predetermined cycles are output from a synchronized signal producing circuit 159 to the memory control circuit 154, the third signal processing circuit 156 and the D/A converter 156, respectively, whereby the respective circuits can be synchronized and image signals including required synchronizing signals can be chosen. Further, timing signals, which are controlled by the CPU 160, are output to the CCD circuit unit 140, the A/D converter 150, the first signal processing circuit 151, the second signal processing circuit 152 and the memory control circuit 154 from a timing signal producing circuit 162, respectively, whereby the respective circuits are synchronized.

The film driving mechanism 170 is fixed to the spool 112 in the film cartridge 110 and is positioned in a film feeding portion which drives the spool 112 clockwise/counterclockwise, a film winding portion which winds the film 114 from the feeding portion and a film conveying path, and further is composed of a device in that the film 114 is fed at a constant speed which can be held by a capstan and a pinch-roller. Further, the film feeding portion drives the spool 112 in the film cartridge 110 clockwise in FIG. 2 to thereby feed the film 114 from the film cartridge 110 until the film top is wound by the film winding portion.

The optical data reading system 180 is composed of a first optical sensor 180A for optically detecting the perforation 114A of the film 114 and a second optical sensor 180B for optically detecting optical data such as a bar code written at the edge of the film, and then it processes the optical data which are detected by the optical sensors 180A and 180B and then outputs it to the CPU 160.

The magnetic record reproducing system 182 includes a magnetic head 182A. The magnetic data stored on the magnetic recording layer 114B of the film 114 are read through the magnetic head 182A, and then are processed and output to the CPU 160. Further, the data input from the CPU 160 are converted to signals to be available for magnetic recording, and then are output to the magnetic head 182A and stored in the magnetic recording layer 114B of the film 114.

The CPU 160 Is connected with a random access memory (RAM) 121, a read only memory (ROM) 122, an electrically eliminatable and programmable read only memory (EEPROM) 123 and a card interface 124, in addition to the operation part 125.

The ROM 122 stores previously a film player control program and a load program for loading the contents in the memory card 120. With the programs memorized in the ROM 122, the CPU 160 processes instructions of a user from the operation part 125 and controls the film player 100. Further, with the programs in the ROM 122, the memorized contents of the memory card 120 are loaded through the card interface 124 to the EEPROM 123 and the contents stored on the RAM 121 and/or the EEPROM 123 are written in the memory card 120 through the card interface 124.

Now, when the film cartridge 110 is loaded, the CPU 160 makes the film 114 feed at a high speed to pre-scan the film 114. At this time, the R, G, B signals of all frames are taken respectively, the gain adjustment value for every color signal is calculated to adjust the offset value and of the white balance for every color signal, and the offset data showing the offset value and the AWB data showing the gain adjustment value for every color signal are stored in the RAM 121 every frame. Further, the AE data showing the brightness of every frame is calculated from the R, G, B signals of every frame, and then stored in the RAM 121. The information stored in the magnetic record layer 114B of the film 114 with the magnetic head built in the camera are read with the magnetic record reproducing system 182 and stored in the RAM 121. Incidentally, the information recorded by the camera are a frame number, a print format showing one of a high vision image, panoramic image and a normal image, data showing a film winding direction which indicates normal-wind or pre-wind during photographing with a camera and the like, and various data can be recorded based on a camera.

After detecting the photographing environment and the like for every frame by the pre-scanning, the film 114 is fed at a low speed to scan, actually. At this time, image signals are taken in accordance with the photographing environment for every frame recorded in the RAM 121. Further, zooming, title input, print input and the like can be achieved by monitoring a film image displayed on the TV monitor based on the image signals. In addition this information can be stored in the RAM 121.

When the film cartridge 110 is taken out, the photographing environment, the editing details, the print information to a processing laboratory and the like for every frame, which are recorded in the RAM 121, are read out. These types of information are written in the record area for every frame of the memory card 120 through the card interface 124 and the memory address showing the record area of every frame is recorded magnetically in the magnetic record layer (see FIG. 3). Then, when each frame of the film cartridge 110 is reproduced, the information recorded in the memory card 120 can be used. Thus, only a little information showing the record area which corresponds to every frame of the memory card 120 may be recorded in the record track which corresponds to each frame of the memory card 120, whereby a lot of information concerning each frame can be recorded in the memory card 120.

Further, the memory capacity concerning each frame is expanded so that code information which is peculiar to a maker and/or a camera, letter information for every frame and the like can all be included. In addition, a code table which is peculiar to each camera is recorded in an external memory medium, whereby special information such as that memorized by an advanced camera can be employed.

Figure 4:
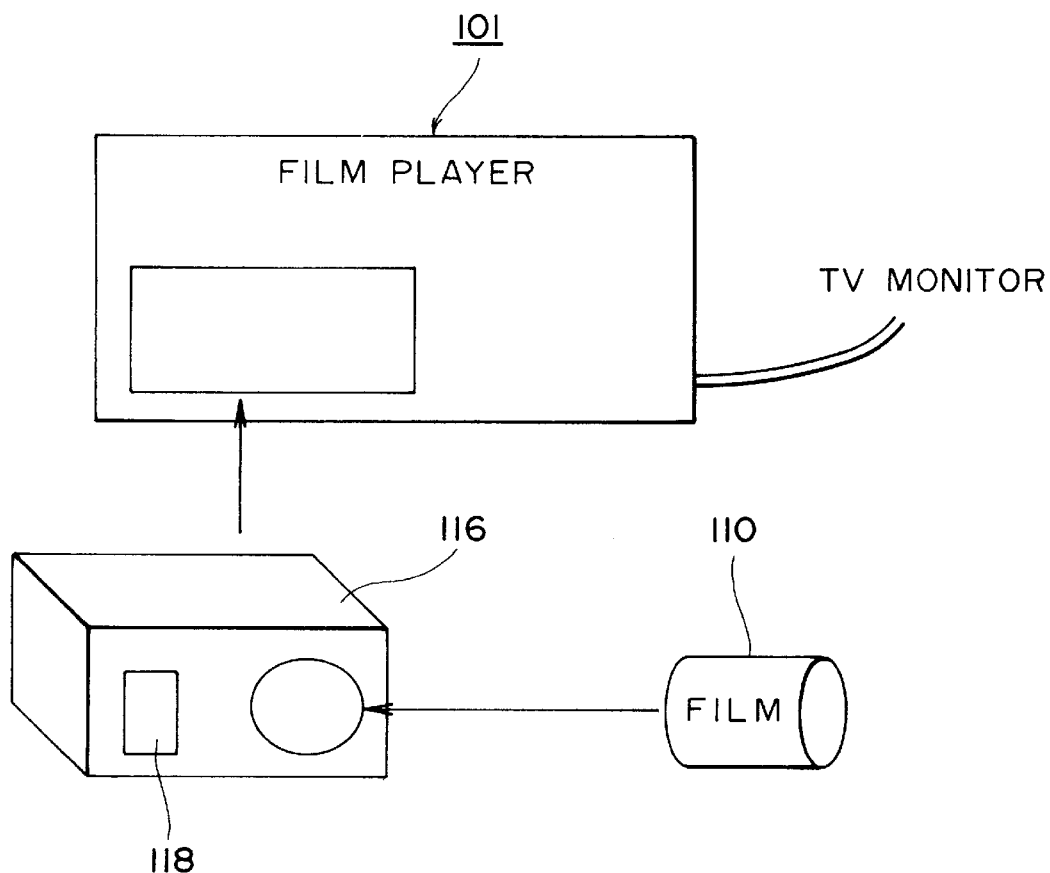
FIG. 4 is a schematic view showing another embodiment of the film player shown in FIG. 1.

Moreover, identification information of the film cartridge 110 is recorded in the memory card 120, and then it is distinguished whether or not said identification information in the memory card 120 corresponds to that of the film cartridge 110 before reproducing. Only when the identification information are the same, the film is made to be reproduced, so that a mistaken combination can be prevented. Further, as another external memory medium, the cartridge 116 in which the film cartridge 110 can be stored and which has an expansion memory inside can be used instead of the memory card 120, as shown in FIG. 4, and the cartridge 116 may be applied to the film player 101.

In this embodiment, the description has been given with regard to the method of memory capacity expansion of the photographing film being applied to the film player. However, this invention should not be so limited and can be applied to a camera. That is, in the camera in which a memory card and the like can be taken in and out, various information such as an environment condition is recorded, and information showing the record area of the memory card is recorded in the magnetic record layer of each frame of the film.

Next, another embodiment of the memory card 120 will be explained.

In FIG. 2, a lab service program is recorded in the memory card 120. The lab service program recorded in the memory card 120 is loaded by a load program stored in the ROM 120 to the EEPROM 123 through the card interface 124.

The film player 100 is provided with an order function. A user can give a desirous order application to the lab with the operation part 125. That is, when the order application of the user is given to the lab, the CPU processes the order with the lab service program stored in the EEPROM 123. For example, when a post card with a photograph is ordered, the order information includes a name, an address, a telephone number, a kind of the card, a negative number, a free sentence, type of information showing various kinds in which a regular sentence and an illustration are included, a number of the order and the like. The order information can be input in dialogue with the operation part 125, for example. When the order application is finished at the film player 110, the order information is written in the magnetic record layer 114B of the memory card 120 or the film 114B.

Now, there is a case in that the service at the lab is changed and/or added, for example, a case in that a number of letters in the free sentence is changed from 150 to 200, a case in that a changeable type is added (that is, the type of 60 kinds is added to the type of 100 kinds), and a case in that a range designating function of the trimming is added since a trimming service support is started. In this case, a new lab service program is supplied from the memory card 120, and then, is loaded from the memory card 120 to the EEPROM 123 through the card interface 124. Thus, the order application can be given with the new lab service program in the EEPROM 123.

Figure 5:
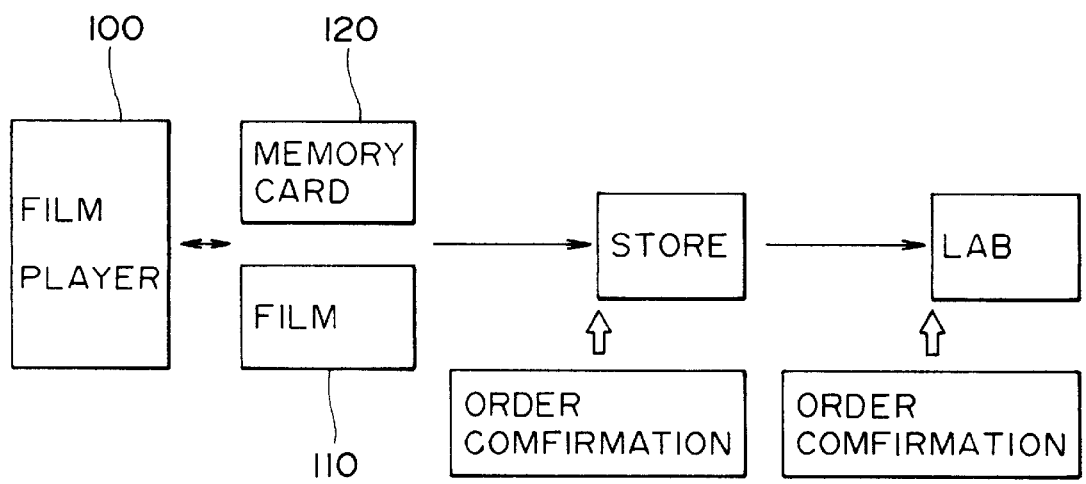
FIG. 5 is a view explaining confirmation of orders when ordering to a lab.
Figure 6:
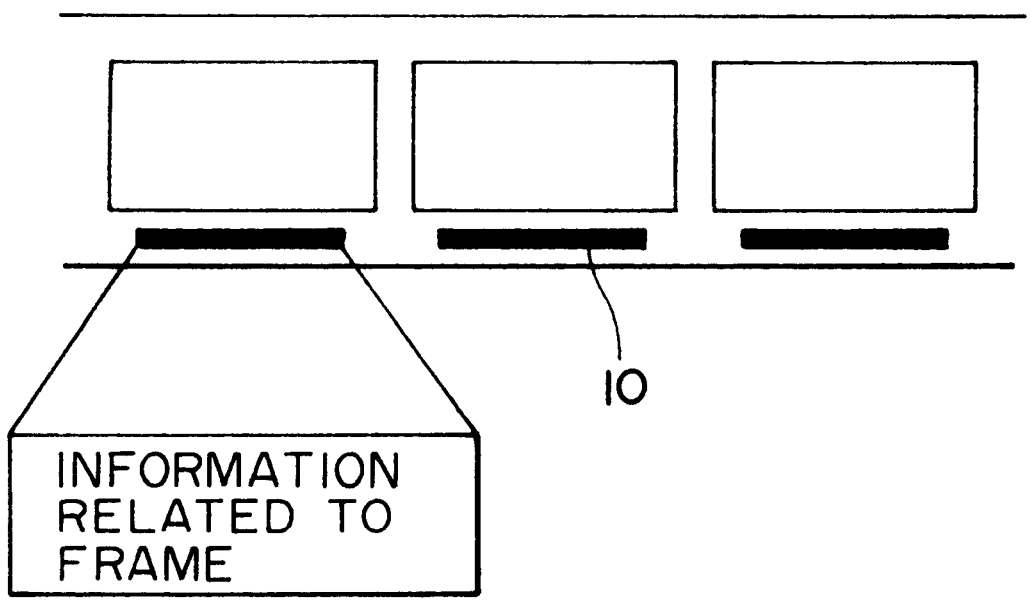
FIG. 6 is a view explaining contents stored in a magnetic record layer for every frame of a photo film.

In addition, a data showing the version of the service may be arranged in the lab service program, and a version check function may be provided while loading. Further, a parameter related to the specifics of the film is written and supplied to the user, whereby the film player can deal with a new film. Moreover, the order contents can be confirmed at a store with the memory card or the film cartridge in which the order information to the lab is written. That is, as shown in FIG. 5, the film cartridge 110 and/or the memory card 120 are set in an instrument at a order reception desk, and when the order information is printed out with the instrument at at the order reception desk, the user can get a print copy. The copy is sent to the lab to thereby check the order information at the lab.

As described above, according to this invention, although only a little information showing the record area which corresponds to each frame of the external memory medium such as a memory card is recorded in the record track which corresponds to each frame of the photographing film, much information related to each frame can be recorded in the external memory medium. Thereby, the memory capacity for the photographing film can be expanded substantially. Further, when the service at the lab is changed and/or added, the user can be served without changing the hardware at the film player.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film player, in which an image of a developed still photographic film is formed on an image sensor and image signals, converted photo-electrically by the image sensor, are output to a display to reproduce a film image, said film player comprising:

an interface for permitting input of a program from an external semiconductor memory, the program being used for changing and adding a function of making an order to a laboratory in a film player, wherein the external semiconductor memory is separate from the developed still photographic film, wherein the developed still photographic film is stored in a film cartridge provided with a single spool;

memory means for holding the memorized contents without backup, said memory means being capable of writing and erasing data therein;

means for loading the program from said external semiconductor memory in said memory means via said interface;

an operation part for creating an order application for a laboratory; and processing means for executing the program stored in said memory means in accordance with the operation of said operation part, and executing a process of making an order to the laboratory.

2. A film player as set forth in claim 1, wherein the photographic film includes a magnetic record layer in which magnetic information is recorded, and said processing means records, in the magnetic record layer, order information to be used by the laboratory, which is based on the order application created by said operation part.

3. A film player as set forth in claim 1, wherein said processing means records order information to be used by the laboratory, which is based on order application created by said operation part, in the external semiconductor memory through said interface.

4. A method of recording and reading regeneration information for use in regeneration of an image of a frame on a developed photographic film onto a monitor, the developed photographic film being coated with a magnetic record layer and stored in a film cartridge provided with a single spool, the method comprising the steps of:

(a) reading an image of a frame on the developed photographic film and reading magnetic information from a magnetic record layer corresponding to the frame when the film cartridge is set;

(b) displaying the image of the frame read from the developed photographic film on the monitor;

(c) receiving an entry of regeneration information for use in regeneration of the image of the frame on the monitor;

(d) storing the regeneration information entered in the step (c) into a storage area of a semiconductor memory and magnetically recording address information indicating the storage area of the semiconductor memory into the magnetic record layer corresponding to the frame;

(e) reading, when the address information is read from the magnetic record layer, the regeneration information from the storage area of the semiconductor memory corresponding to the address information; and (f) regenerating the image of the frame read from the developed photographic film on the monitor according to one of the regeneration information entered in the step (c) and the regeneration information read in the step (e).

5. The method as defined in claim 4, wherein:

the semiconductor memory is an external semiconductor memory apart from the film cartridge;

the step (d) includes the sub-step of recording identification information identifying the developed photographic film into the external semiconductor memory;

the method further comprises the step of reading, prior to the step (e), the identification information from the external semiconductor memory and comparing the identification information read from the external semiconductor memory to the identification information of the developed photographic film; and the step (e) is executed only when the identification information correspond to one another.

6. The method as defined in claim 5, wherein the external semiconductor memory is an IC card.

7. A method of recording and reading print order information for use in printing of an image of a frame on a developed photographic film, the developed photographic film being coated with a magnetic record layer and stored in a film cartridge provided with a single spool, the method comprising the steps of:

(a) reading an image of a frame on the developed photographic film and reading magnetic information from a magnetic record layer corresponding to the frame when the film cartridge is set;

(b) displaying the image of the frame read from the developed photographic film on the monitor;

(c) receiving an entry of print order information for use in printing of the image of the frame;

(d) storing the print order information entered in the step (c) into a storage area of a semiconductor memory and magnetically recording address information indicating the storage area of the semiconductor memory into the magnetic record layer corresponding to the frame; and (e) reading, when a print of the image of the frame is ordered by means of the film cartridge and the semiconductor memory, the address information from the magnetic record layer corresponding to the frame and reading the print order information from the storage area of the semiconductor memory corresponding to the address information.

8. The method as defined in claim 7, wherein:

the semiconductor memory is an external semiconductor memory apart from the film cartridge;

the step (d) includes sub-step of recording identification information identifying the developed photographic film into the external semiconductor memory;

the method further comprises the step of reading, prior to the step (e), the identification information from the external semiconductor memory and comparing the identification information read from the external semiconductor memory to the identification information of the developed photographic film; and the step (e) is executed only when the identification information correspond to one another.

9. The method as defined in claim 8, wherein the external semiconductor memory is an IC card.

* * * * *

UNITED STATES PATENT AND TRADEMARK OFFICE
CERTIFICATE OF CORRECTION

PATENT NO.      : 6,160,577
DATED           : December 12, 2000
INVENTOR(S)     : Toru Nishimura et al.

It is certified that error appears in the above-identified patent and that said Letters Patent is hereby corrected as shown below:

In category "[22] Filed:" please correct the filing date from "May 8, 1997" to -- May 9, 1997 --.

Signed and Sealed this

Eleventh Day of September, 2001

*Attest:*

NICHOLAS P. GODICI
*Attesting Officer*     Acting Director of the United States Patent and Trademark Office